April 4, 1967 J. R. COUSINS ETAL 3,312,938

DATA SIGNALLING SYSTEMS WITH PROVISION FOR SYNCHRONIZING THE TERMINAL EQUIPMENT BY TRANSMITTING SYNCHRONIZING SIGNALS WHEN LOSS OF SYNCHRONISM HAS BEEN DETECTED

Filed June 3, 1963 9 Sheets-Sheet 2

United States Patent Office 3,312,938

Patented Apr. 4, 1967

3,312,938

DATA SIGNALLING SYSTEMS WITH PROVISION FOR SYNCHRONIZING THE TERMINAL EQUIPMENT BY TRANSMITTING SYNCHRONIZING SIGNALS WHEN LOSS OF SYNCHRONISM HAS BEEN DETECTED

John Richard Cousins, Coventry, and Frederick Claude Robertson, Kenilworth, England, assignors to The General Electric Company Limited, London, England Filed June 3, 1963, Ser. No. 285,151
5 Claims. (Cl. 340—146.1)

Figure 1:
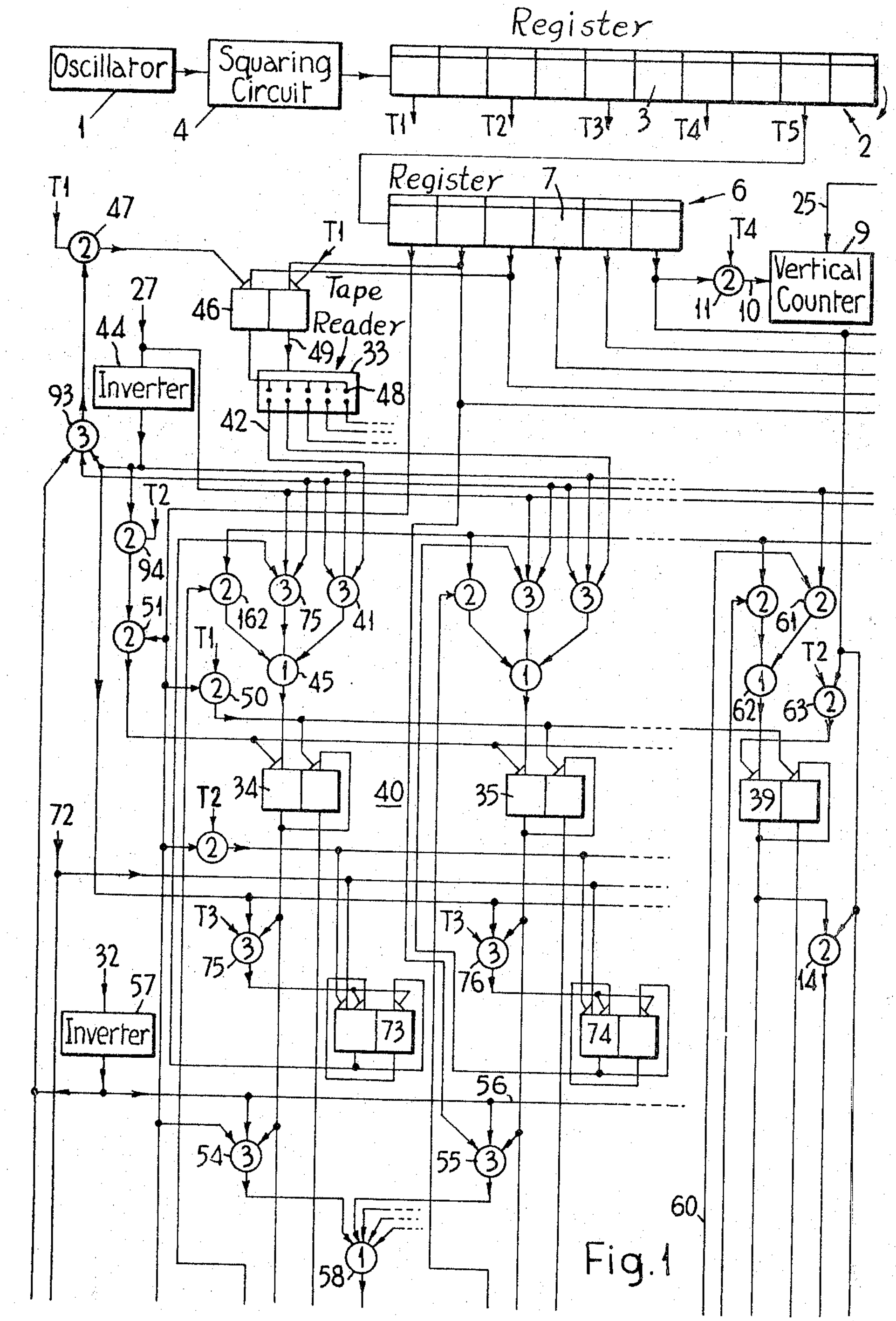
Figure 2:
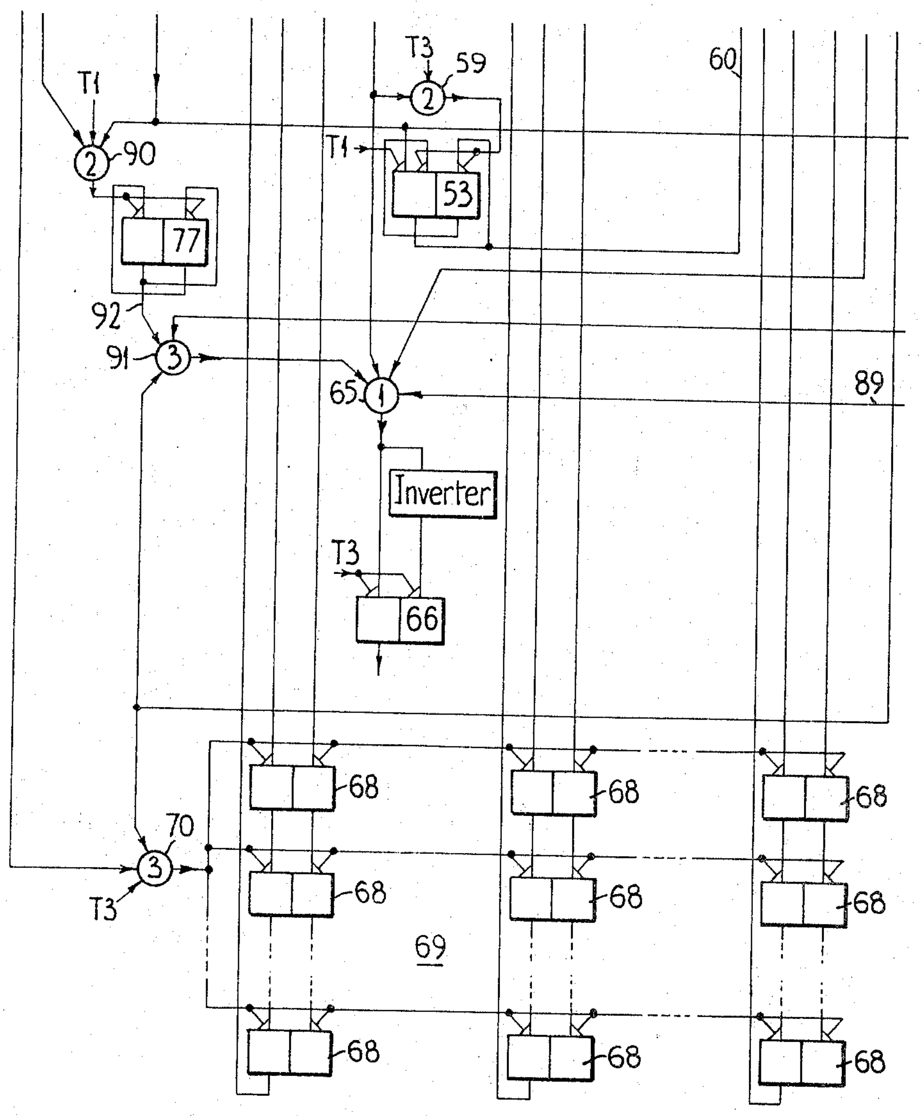
Figure 3:
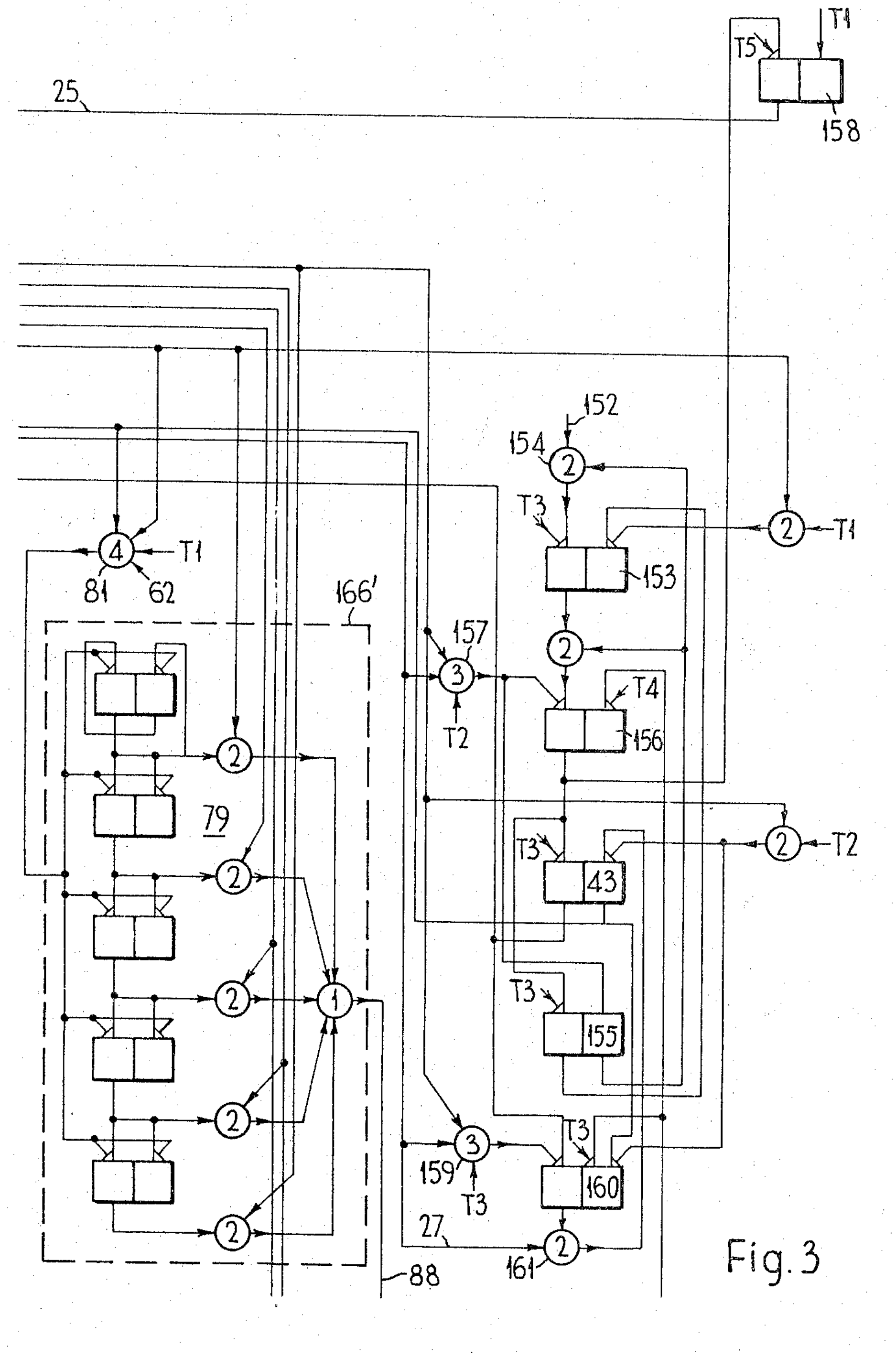
Figure 4:
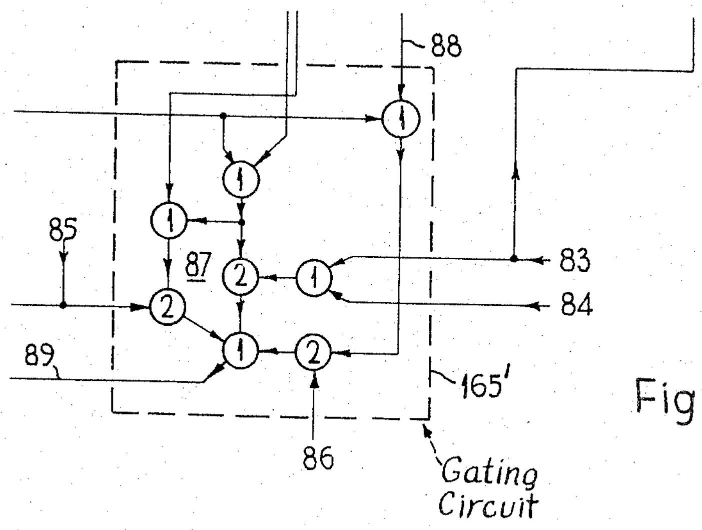

This invention relates to data signalling systems and is more particularly concerned with signalling systems of the kind in which, during operation, elements of information to be signalled are transmitted successively and each element has selectively one or other of a small number (for example two) of different values.

The invention is also concerned with equipment for use in signalling systems of the kind specified.

For the purpose of improving the overall accuracy of a signalling system of the kind specified, it is known to signal additional elements which enable a check of the received information to be effected at the receiving station of the system and one object of the present invention is to provide an improved system which operates in this manner.

It is well known in signalling systems of the kind specified to synchronize the operation of equipment at the receiving station of the system by transmititng synchronizing information in time multiplex with the intelligence to be signalled over the system. It is clearly undesirable for the time during which the synchronizing information is transmitted to be a large fraction of the total signalling time and another object of the present invention is to enable the time for transmitting synchronizing information to be kept to a small fraction of the total.

According to the present invention, in a data signalling system of the kind specified in which information is signalled as groups of elements and each group may be considered as a rectangular array of elements arranged in rows and columns while there are additional elements signalled to enable a check to be effected on the overall accuracy of transmission, the transmitting station of the system has means to store a complete group of elements, including the check elements, after transmission by that station so that the group can be retransmitted upon a request from the receiving station while at the receiving station there is means to detect any discrepancy between the elements being signalled and the check elements as received and to signal to the transmitting station a request for retransmission of the group as aforesaid if such discrepancy is detected, the transmititng station also having means to cause a plurality of said elements to be transmitted at least for the purpose of signalling synchronizing information prior to the retransmission of a group of elements in respect of which a discrepancy has been detected at the receiving station while at the receiving station a cyclic counting circuit which is arranged to take up a different condition for each of said rows of elements in a group has its capacity temporarily increased so as to enable it to take up one or more additional conditions at least while said plurality of elements is being received and thereafter to revert to its lower capacity.

The plurality of elements referred to in the last paragraph may, in addition to signalling synchronizing information (which may be identified by a characteristic pattern of elements), also include one or more group identifying elements which change from group to group in a predetermined manner, the receiving station also having means to determine whether the group identifying element or elements indicate that the next group of elements to be signalled is the correct group to be received after a request for retransmission as aforesaid.

According to other aspects of the invention, there are provided transmitting and receiving station equipments for use in systems as set out in the preceding paragraphs.

Figure 5:
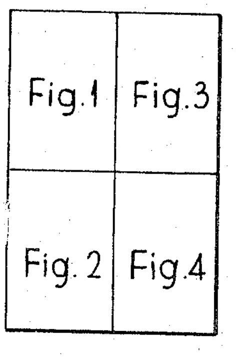

One example of a system in accordance with the present invention for signalling binary data over a voice frequency circuit will now be described with reference to the accompanying drawings in which:

FIGURES 1, 2, 3 and 4 together show diagrammatically the circuit of the transmitting station equipment when arranged in the manner shown in FIGURE 5.

Figure 6:
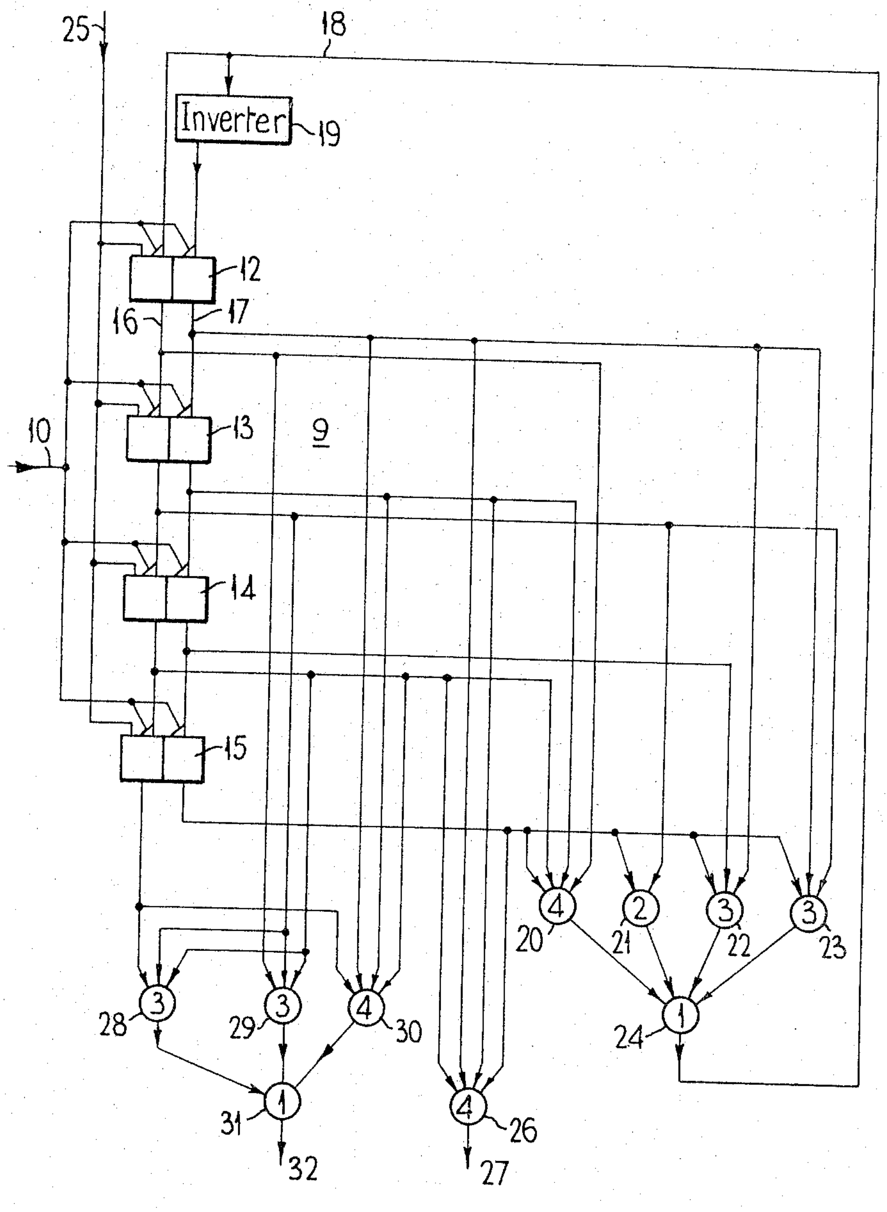
Figures 7, 11:
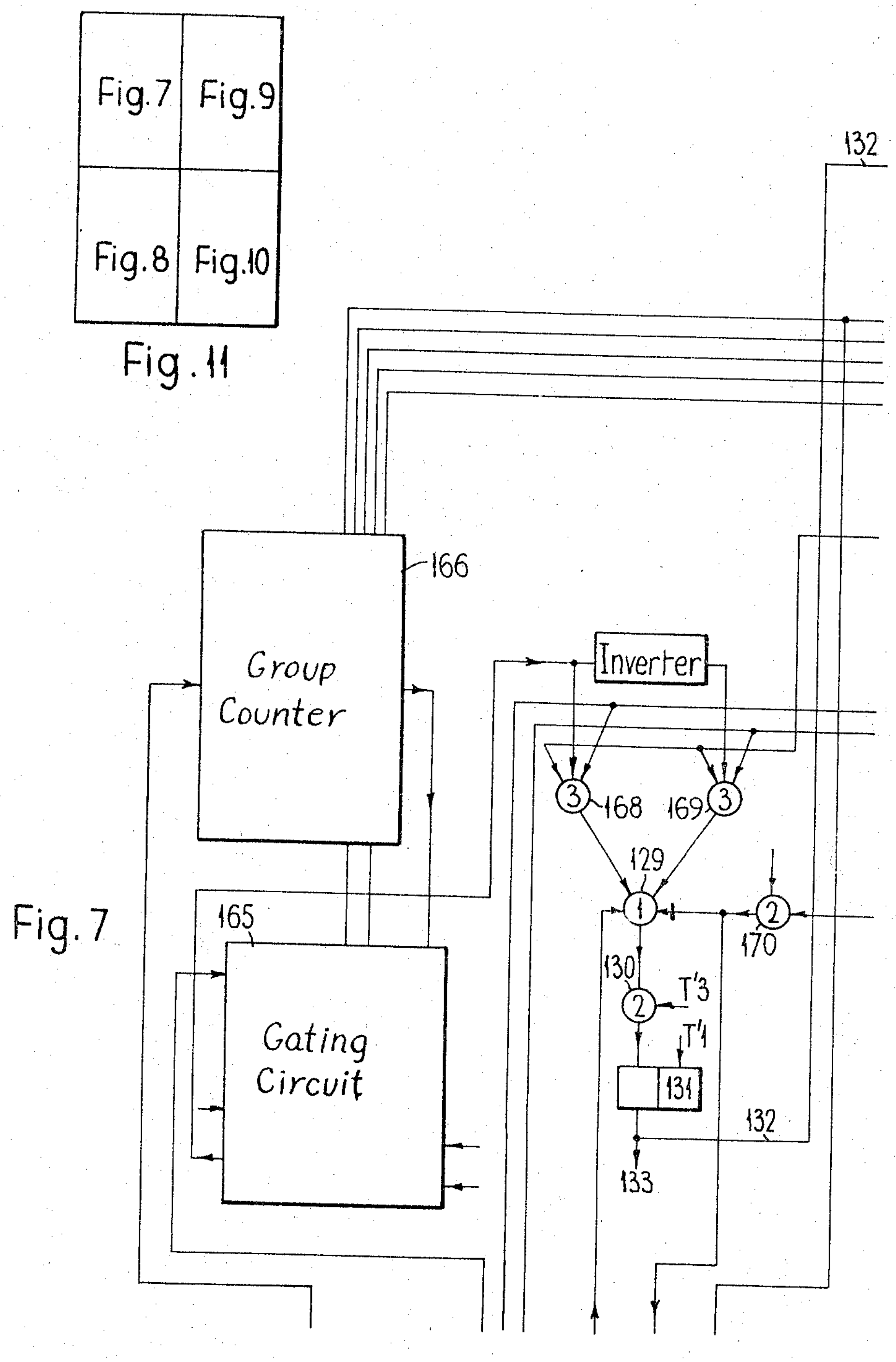
Figure 8:
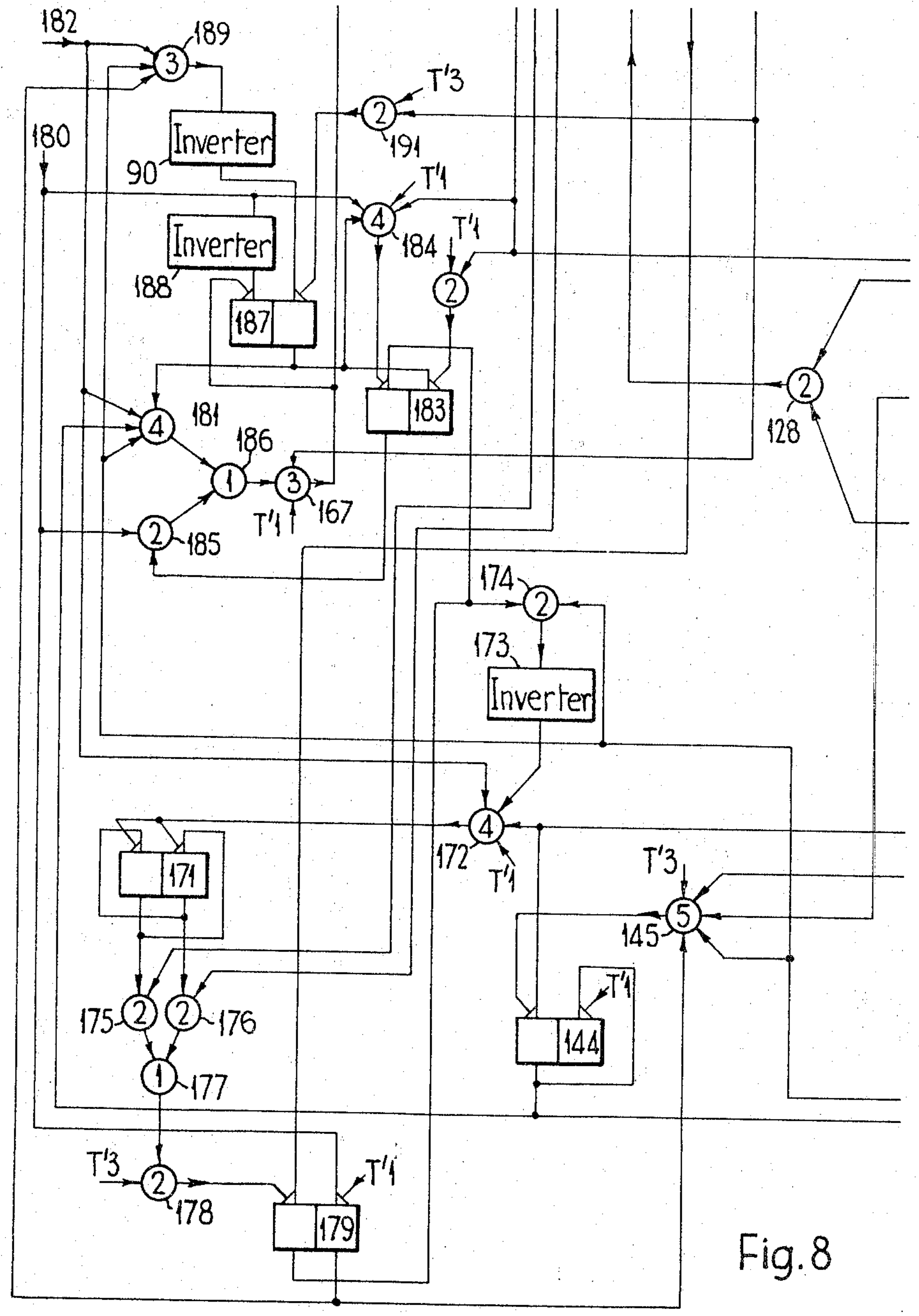
Figure 9:
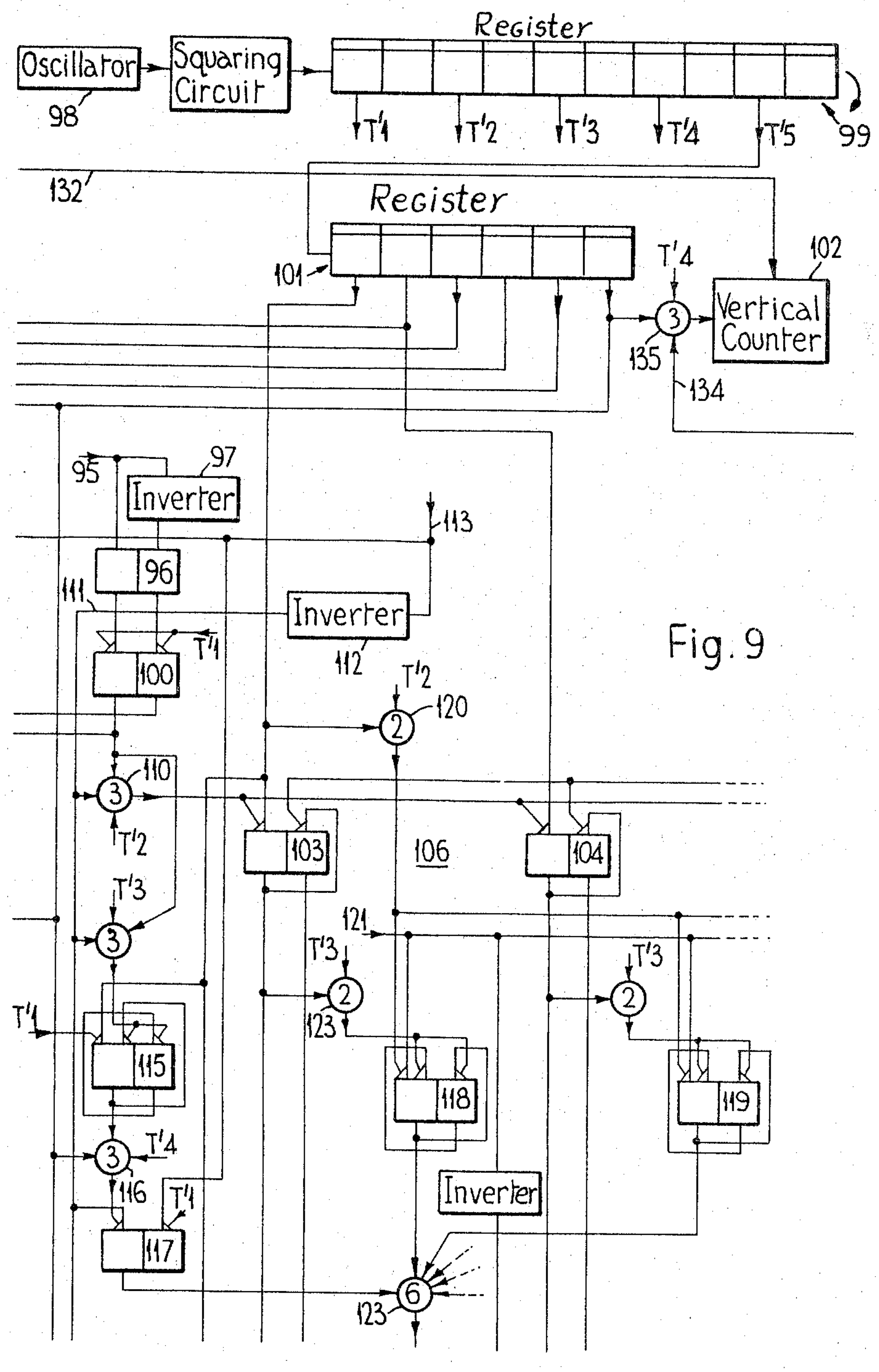
Figure 10:
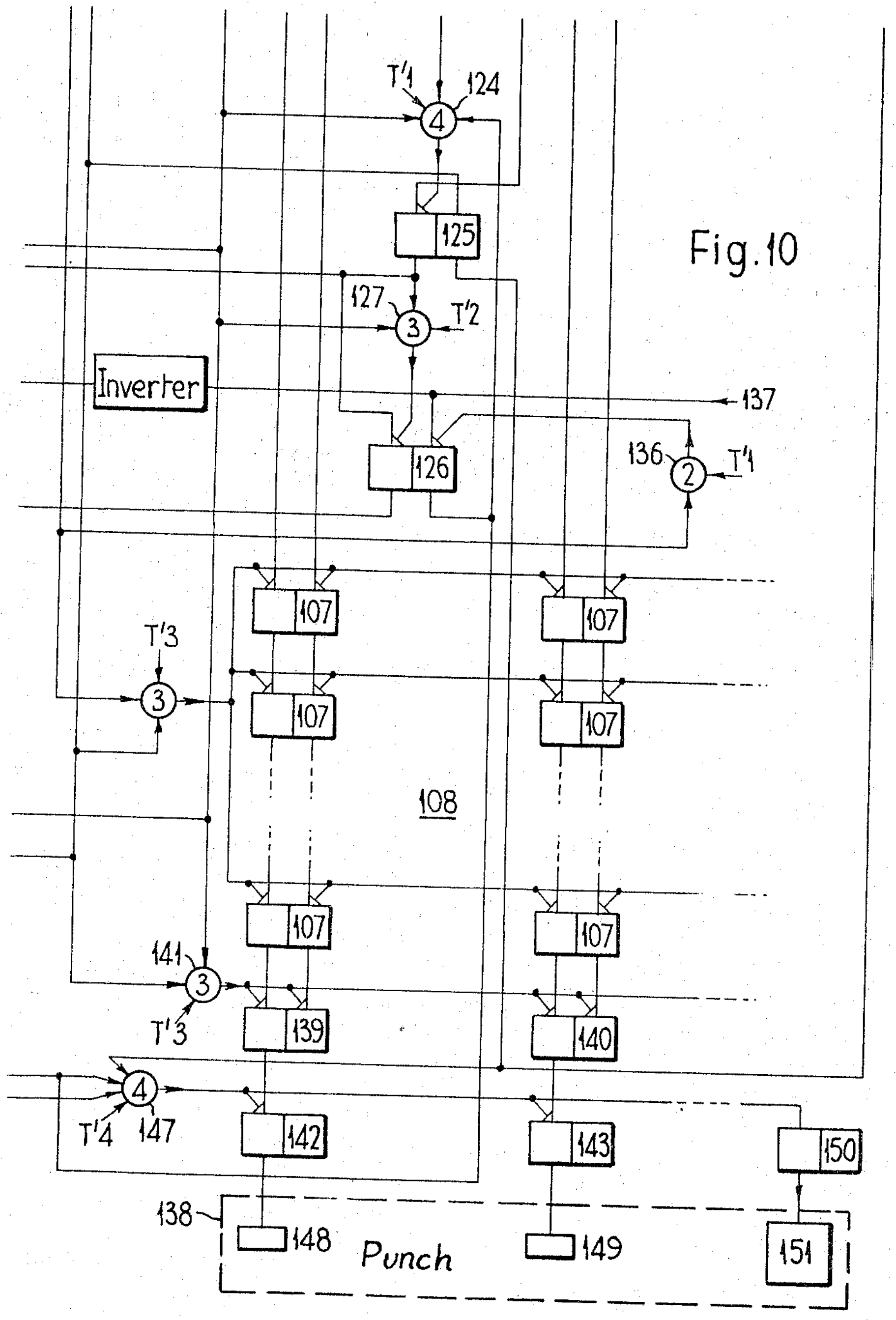

FIGURE 6 shows the circuit of the vertical counter of the transmitting station equipment, and FIGURES 7, 8, 9 and 10 show diagrammatically the circuit of the receiving station equipment when arranged in the manner shown in FIGURE 11.

At the transmitting station the data to be signalled is read off a punched tape and at the receiving station an identical tape is reproduced.

The punched tape has five tracks of code positions at each of which there may be a hole. For the purpose of transmission the data read off from nine successive rows on the tape is treated as a group. It is convenient to consider each such group as a rectangular array of nine rows each containing five digits, each of these digits having a value of either "0" or "1". The digits in each of these rows of the array are read from one row of the punched tape. Associated with each row of the array there is an additional digit which provides a parity check in respect to the digits of that row. In fact each of these parity digits is chosen to have a value such that the number of digits having the value "1" in the appropriate row with its parity digit is odd.

There are six further parity digits associated with each array. Five of these parity digits are associated respectively with the five columns of the array and have a value such that the number of digits in each complete column with its parity digit having the value "1" is odd. The sixth of these parity digits is similarly associated with the "column" of row parity digits.

Referring now to FIGURES 1 to 4, the operation of the equipment at the transmitting station is controlled by an oscillator 1 which may have a frequency of the order of 5 kilocycles per second. The oscillator 1 is arranged to drive a ten-stage circulating register 2 each stage 3 of which is formed by a bistable circuit. (It may be mentioned here that these bistable circuits and others which will be referred to subsequently herein are each formed in known manner by a pair of cross-connected junction transistors.)

It is convenient to consider the two states of each stage 3 of the circulating register 2 as "0" and "1" respectively and the arrangement is such that at any time only one of the ten stages is in its "1" state while all the remaining stages are in their "0" states. The output of the oscillator 1 after passing through a squaring circuit 4 is supplied to the circulating register 2 for the purpose of shifting the information stored by the ten stages 3 thereof so that each of these stages is switching to its "1" state cyclically. Timing signals for controlling the apparatus of the remainder of the equipment at the transmitting station are taken by way of leads 5 from every other stage of this circulating register and each of these timing signals consist of a pulse of a train of regularly recurrent pulses. In the order in which these timing signals occur they are subsequently referred to as the timing signals T1, T2, T3, T4 and T5 respectively.

The timing signal T5 is supplied as a train of shift pulses to a six-stage circulating register 6 which constitutes a digit counter and which is constructed and arranged in exactly the same manner as the circulating register 2. Accordingly only one of the stage 7 of the digit counter 6 is switched to its "1" state at any time although each stage 7 is switched to this state in turn.

The particular stage of the digit counter 6 that is switched to its "1" state at any time supplies a signal over an associated lead 8. The lead 8 that carries such a signal at any time determines the column of the array of digits (including the parity digits) of a digit then being processed by the transmitting station equipment. The row of such a digit is similarly determined by the state of another counter 9 which is subsequently referred to as the "vertical counter." In fact the counter 9 responds to every sixth timing signal T4 that is supplied thereto over a lead 10 after having been selected by a coincidence gate 11.

Referring now to FIGURE 6 the vertical counter 9 comprises four bistable circuits 12, 13, 14 and 15 which are connected in the manner of a shift register, shift pulses being supplied thereto by way of the lead 10. The two states of each of these circuits 12 to 14 may be considered as "0" and "1" respectively, the circuit 12, for example, supplying a signal over its output lead 16 when in its "1" state and over its other output lead 17 when in its "0" state. Each shift pulse supplied to the counter 9 causes the circuits 13, 14 and 15 to be switched to the conditions of the circuits 12, 13 and 14 respectively. For this purpose priming signals are supplied to the circuits 13, 14 and 15 over leads, such as the leads 16 and 17, together with the pulses on the lead 10. (It will be seen that the leads carrying signals to bistable circuits 12 to 15 and to other bistable circuits in FIGURES 1 to 4 and FIGURES 7 to 11 are shown diagrammatically in the manner recommended on page 17 of Supplement No. 5 (1962) of British Standard No. 530 (1948).

Each shift pulse supplied over the lead 10 also normally sets the circuit 12 to its "0" state, there being no signal on the lead 18 at this time so that the inverter 19 supplied a priming signal to the right-hand side of the circuit 12. Gates 20 to 24 are provided to cause the circiut 12 to be switched to its "1" state upon the occurrence of a shift pulse whenever the counter is in any of the certain conditions. It is convenient to refer to the state, namely "0" or "1," of the bistable circuits 12, 13, 14 and 15 as A, B, C and D respectively and the conditions mentioned in the last sentence are as follows:

| Conditions of circuits **12** to **15**: | Detected by Gate |
|---|---|
| A=1, B=0, C=1, D=0 | **20** |
| B=1, D=0 | **21** |
| A=0, C=0, D=0 | **22** |
| A=0, B=1, D=0 | **23** |

Each of the gates 20 to 23 supplies a signal when the appropriate conditions are detected thereby and such a signal is passed through the gate 24 to cause a priming signal to be supplied to the left-hand side of the bistable circuit 12 so that the next shift pulse causes that circuit to be switched to its "1" state.

The vertical counter 9 is arranged to effect a cyclic count of ten although under certain conditions which will subsequently be described more fully, it may be caused to take up four additional states which are referred to herein as counts of eleven, twelve, thirteen and fourteen. When the vertical counter is reset, by a timing signal T3 when a priming signal is supplied over a lead 25, the circuits 12, 13 and 14 are all forced to take up their "1" state while the circuit 15 takes up its "0" state and this is the condition corresponding to a count of eleven. The state of the circuits 12 to 15 for each count of the counter 9 is given in the following table:

| Vertical Count | State of Circuits 12 to 15 | | | |
|---|---|---|---|---|
| | A= | B= | C= | D= |
| 11 | 1 | 1 | 1 | 0 |
| 12 | 1 | 1 | 1 | 1 |
| 13 | 0 | 1 | 1 | 1 |
| 14 | 0 | 0 | 1 | 1 |
| 1 | 0 | 0 | 0 | 1 |
| 2 | 0 | 0 | 0 | 0 |
| 3 | 1 | 0 | 0 | 0 |
| 4 | 0 | 1 | 0 | 0 |
| 5 | 1 | 0 | 1 | 0 |
| 6 | 1 | 1 | 0 | 1 |
| 7 | 0 | 1 | 1 | 0 |
| 8 | 1 | 0 | 1 | 1 |
| 9 | 0 | 1 | 0 | 1 |
| 10 | 0 | 0 | 1 | 0 |
| 1 | 0 | 0 | 0 | 1 |

It will be noted that whereas the vertical counter 9 automatically counts from one to ten and then back to one, it can only take up the conditions corresponding to vertical counts of eleven, twelve, thirteen and fourteen by being reset as aforesaid.

A coincidence gate 26 is arranged to detect the appropriate conditions of the circuits 12 to 15 corresponding to a count of ten and then to supply a signal over a lead 27. Similarly further gates 28 to 31 are arranged to supply a signal over a lead 32 whenever the counter 9 is registering a count of eleven, twelve, thirteen or fourteen. Other gates (not shown) responsive to the appropriate state of the circuits 12 to 15 are provided in similar manner to supply signals when the counter 9 is registering counts of one, eleven, twelve, thirteen and fourteen respectively.

As the five digits of each row of the punched tape are read off by a punched tape reader 33, they are normally transferred respectively to five bistable circuits (of which only the two circuits 34 and 35 are shown) which, together with another bistable circuit 39, constitute a temporary store 40. Each of the bistable circuits 34 to 38 has an associated coincidence gate 41 to which the tape reader 33 supplies a signal over a lead 42 if the appropriate digit being read thereby has the value 1. The gate 40 also has supplied thereto a signal when a further bistable circuit 43, which is hereinafter referred to as the "second transmitter error store," is not in its condition signifying that an error has been detected and a signal supplied by an inverter 44 to which is fed the signal on the lead 27 (FIGURE 6). Thus a priming signal is supplied to the bistable circuit 34 via a gate 45 if the digit to be stored thereby has the value "1" provided the store 43 has not been switched as a result of an error having been detected and the vertical counter 9 is not registering a count of ten.

A further bistable circuit 46 is arranged to act as a tape reader control circuit. Under normal conditions this circuit is set to a particular one of its stable states by each timing signal T1 that occurs when the third stage, say, of the digit counter 6 is in its "1" state (other than when the vertical counter is registering a count of ten as determined by a gate 47). When this circuit 46 is switched to said particular state, a signal is supplied to each of the five sensing contacts 48 or other elements of the tape reader 33. The reader control circuit 46 is reset to its other state by a timing signal T1 occurring when the second stage of the digit counter 6 is in its "1" state and at that time a signal is supplied over a lead 49 to the tape reader 33 to engage the clutch and to release the brake (neither of which is shown in the drawing) therein so that the tape (also not shown) is advanced and the next row of holes in the tape is brought to the reading station.

The bistable circuits of the temporary store 40 are all set to their states corresponding to the digit value "0"

upon the occurrence (determined by a gate 50) of each timing signal T1 when the digit counter 6 has its first stage in the "1" state. Those of these circuits that are to be switched to store the digit value "1," upon a row of holes being read by the tape reader 33, are then changed. In fact each of the circuits 34 to 38 responds to the simultaneous occurrence of a signal supplied by the tape reader 33 (under control of the tape reader control circuit 46 as aforesaid) and a timing signal T2 when, as determined by a gate 51, the first stage of the digit counter is in its "1" state.

A further bistable circuit 53 constitutes a row parity counter. Associated with each of the five bistable circuits 34, 35 etc., is a coincidence gate, such as the gate 54 and 55, and these gates are arranged to supply a signal in turn if the associated bistable circuit is storing the digit value "1" and the vertical counter 9 is not registering a count of eleven, twelve, thirteen or fourteen. For this purpose, one input of the gate 54, say, is connected to one of stages 7 of the digit counter 6, in this case the first such stage, and another input is connected to a lead 56. An inverter 57 is connected between the lead 32 (FIGURE 6) and the lead 56 so that there is normally a signal on the lead 56. Signals passed by the gates, such as the gates 54 and 55, are combined by a gate 58.

The store 53 is set to one of its stable states by a timing signal T1 when the first stage of the digit counter is in its "1" state. A gate 59 is arranged to detect coincidence of a timing signal passed by the gate 58, signals supplied by the gate 59 being utilised to change the state of the store 53. The state of the counter 53 represents a row parity digit. If the store 53 is then in said state, a signal supplied over the lead 60 is passed through the gate 61 (provided the store 43 is in the state previously mentioned) and the gate 62 so that, upon the occurence of the next timing signal T2 (as determined by a gate 63), the bistable circuit 39 is set to its state corresponding to the digit value "1."

A coincidence gate 64 is arranged to pass a signal when the bistable circuit 39 is storing the digit value "1" and the sixth stage of the digit counter 6 is in its "1" state. Signals supplied by the gate 58 and 64 are combined by a gate 65 which supplies priming signals to one side of another bistable circuit 66 which is hereinafter referred to as the "line store" and which is arranged to control the instantaneous level of the output signal of the transmitting station, this latter signal having a level corresponding to the digit value "1" when it is in one stable state and to the digit value "0" when it is in its other state. An inverter 67 to which is passed the output of the gate 65 supplies priming signals to the other side of the line store 66. The line store 66 may be switched from either of its states to the other by timing signals T3 supplied thereto over a lead 67.

A group of one hundred and twenty bistable circuits 68 (of which only nine are shown in the drawings) constitute a main store 69 to which the digit values stored by the temporary store are transferred. The bistable circuits 68 can be considered as forming a rectangular array of twenty rows each of six circuits. The twenty bistable circuits of each column of this array are associated with one of the circuits, such as the circuits 34, 35 and 39, of the temporary store 40.

During normal operation, the digit values stored by the temporary store 40 are in fact transferred to the first row of circuits 68 of the main store 69 upon each timing signal T3 when the sixth stage of the digit counter is in its "1" state, as determined by a gate 70. At the same time the digit values stored by each row of the main store 69, other than the last row, are transferred to the next row.

There are also five bistable circuits (of which only two circuits 73 and 74 are shown in the drawings) which constitute column parity counters associated one with each of the bistable circuits, such as the circuits 34 and 35, of the temporary store 40. These column parity counters are all set to a particular state by a timing signal T2 when the vertical counter 9 is registering the count one and the first stage of the digit counter 6 is in its "1" state, for this purpose priming signals being supplied to these bistable circuits over the lead 72 by the vertical counter 9 and switching signals being supplied by a gate 74. Coincidence gates 75, 76 etc., are arranged each to supply timing signals T3 to the counters 73, 74 etc., to change the state thereof whenever the associated circuit 34 or 35 of the temporary store 40 is storing the digit value "1" and the vertical counter 9 is not registering a count of ten.

When the vertical counter 9 is registering the count ten, the column parity counters 73, 74 etc., are storing the required five column parity digits and these parity digit values are then transferred to the appropriate five circuits 34, 35 etc., of the temporary store 40. The circuit 34, for example, has an associated coincidence gate 75 which is arranged to supply the next timing signal T2 to the gate 45 if the column parity digit in question has the value "1" and provided the store 43 is then in the state previously considered. The circuit 34 is thus switched as previously to store the appropriate column parity digit. (It will be appreciated from the above that a row parity digit is derived in the manner previously described in respect of the "row" of the five column parity digits and that all these parity digits are passed in turn to the line store 66.)

A the commencement of signalling and subsequently when a repeat transmission is required, as will hereinafter be described, there is transmitted a group of digits for the purpose of synchronizing the equipment at the receiving station of the system and, in the event of a retransmission, ensuring that a group of digits is not lost. The digits of this "synchronizing" group, as transmitted, are themselves indistinguishable from those transmitted when intelligence is being signalled; they do however have a characteristic pattern that is recognized at the receiving station.

Such a group of "synchronizing" digits is transmitted when the vertical counter 9 at the transmitting station is registering counts of eleven, twelve, thirteen and fourteen. The digital value of this signal at any time depends upon the count registered by the vertical counter 9 and by the digit counter 6. The digital pattern of the "synchronizing" signal is shown below:

| Vertical Count | Stage of Digit Counter Storing "1" | | | | | |
|---|---|---|---|---|---|---|
| | 1st | 2nd | 3rd | 4th | 5th | 6th |
| 11 | 1 | 0 | 0 | 1 | 0 | 0 |
| 12 | 1 | 0 | 0 | 1 | 0 | 0 |
| 13 | 1 | 0 | 0 | 1 | 1 | 1/0 |
| 14 | 1 | 1/0 | 1/0 | 1/0 | 1/0 | 1/0 |

Only the first seventeen digits of this group (namely all the digits when the vertical counter 9 is registering counts of eleven and twelve and the first five digits when that counter is registering a count of thirteen) are utilized at the receiving station for the purpose of checking synchronization. The last digit transmitted during a vertical count of thirteen has a value of either "0" or "1" depending upon the state of a bistable circuit 77 of the transmitting station equipment, this circuit (which is subsequently referred to as the "odd/even store") being arranged normally to change its state as each group of digits read off from the punched tape is signalled and this digit subsequently being termed the "odd/even digit."

The last five digits transmitted when the vertical counter 9 is registering a count of fourteen represent (each by a "0" or a "1") the states of the individual stages 78 respectively of a five-stage binary counter 79 (subsequently referred to as the "group counter") which is arranged to count the groups of digits read off from the punched tape that are signalled. These digits are subsequently referred to as the "group count digits."

The group counter 79 is initially set so that each stage 80, which is formed by a bistable circuit, is set to one of its states corresponding to the digit value "0." A gate 81 is arranged to supply a timing signal T1 to this counter 79 when there is coincidence with the signal supplied by the vertical counter 9 over lead 82 (when that counter is registering a count of one), the signal supplied by the second stage of the digit counter 6 when in its "1" state, and the signal supplied by the second transmitter error store 43 when not in the state to which it is switched upon a request for a retransmission. Each pulse supplied by this gate 81 is fed to the five-stage counter 79 and is utilized to advance by one of the count registered thereby.

Signals are supplied by the vertical counter 9 to leads 83, 84, 85 and 86 when that counter is registering counts of eleven, twelve, thirteen and fourteen. These signals are combined by means of a gating network 87 with signals supplied by the digit counter 6 and a signal supplied over a lead 88 so that there is supplied over the lead 89 a signal that represents the "synchronizing" digits with the exception of the last digit corresponding to a vertical count of thirteen. The signal supplied over the lead 88 represents the states of the various stages 80 of the group counter 79.

A gate 90 is arranged to supply a timing signal T'1 to switch the odd/even store 77 at the beginning of the transmission of each group of digits, that is to say when the vertical counter 9 is registering a count of one and the first stage of the digit counter 6 is in its "1" state. Another gate 91 supplies a signal to the gate 65 if the odd/even store 77 is in a particular state so as to supply a signal over its output lead 92 during the last digit count by the counter 6 when the vertical counter 9 is registering a count of thirteen. The odd/even digit is, therefore, passed to the line store 66 so that the appropriate value for that digit is signalled as required.

The equipment at the transmitting station is not, of course, required to read digits from the punched tape in to the temporary store 40 while the "synchronizing" signal is being transmitted. Accordingly, at this time, no signal is supplied by the gate 93 to the gate 47 so as to inhibit the supply, as aforesaid, of timing signals T1 to the tape reader control circuit 46. Similarly no signal is supplied at this time by the inverter 57 so that the supply of timing signals through the gate 94 to the gate 51 with the result that digit values cannot then be read into the temporary store 40. Again no signal is then supplied by the inverter 57 to the gate 70 so that the supply of timing signals T3 to the main store 69 is inhibited under these conditions and digit values are not transferred from the temporary store 40 to the main store 69 and from row to row within the main store.

Referring now to FIGURES 7 to 10, the signal received by the receiving station of the system is fed over a lead 95 and is utilized to control a bistable circuit 96 which constitutes an input store that is arranged momentarily to store each received digit in turn. The signal on the lead 95 and the inverse of that signal supplied by an inverter 97 are fed to the two sides of the input store 96.

An oscillator 98 which has approximately the same frequency as the oscillator 1 at the transmitting station is arranged to drive a ten-stage circulating register 99 which is arranged in similar manner to the circulating register 2 at the transmitting station. This circulating register 99 supplies five interlaced timing signals which are subsequently referred to as T'1, T'2, T'3, T'4 and T'5 respectively. The transitions in the state of the first input store 96 may be utilized to control the frequency of the oscillator 98 so as to obtain frequency lock between the transmitting and receiving station equipments.

Upon the occurrence of each timing signal T'1, the digit value stored by the input store 96 is transferred to a similar second input store 100.

A six-stage circulating register 101 is arranged to be driven by the timing signals T'5 so as to provide a digit counter in exactly the manner of the counter 6 of the transmitting station. There is also provided a vertical counter 102 formed by four bistable circuits (not shown) in exactly similar manner to the counter 9 at the transmitting station.

The receiving station is also provided with six bistable circuits (of which only the circuits 103, 104 and 105 are shown) which form a temporary store 106 into which the digits momentarily stored by the input store 100 are transferred and a further fifty bistable circuits (of which only six circuits 107 are shown) which form a main store 108 to which the digit values are subsequently transferred.

The six bistable circuits 103, 104 etc., of the temporary store 106 are all set to a particular state (corresponding to the digit value "0") upon the occurrence of a timing signal T'1 when, as determined by a gate 109, the first stage of the digit counter 101 is in its "1" state. Timing signals T'2 are supplied to a gate 110 together with the output signal of the input store 100 and the signal on a lead 111 which is present when the vertical counter 102 is not registering a count between eleven and fourteen inclusive. (An inverter 112 is connected between a lead 113 which is supplied by the vertical counter 102 and which corresponds to the lead 32 at the transmitting station for the purpose of deriving the latter signal.) The resulting pulse signal supplied by the gate 110 is fed to all the bistable circuits 103, 104, 105 etc., of the temporary store 106 together with a signal supplied by the digit counter 101 which is individual to that circuit. The five bistable circuits of the temporary store 106 are thus set during normal reception to states corresponding to the digit values of a row of digits.

The main store 108 which can be considered as being arranged in ten rows and five columns in similar manner to the corresponding circuits of the main store 40 of the transmitting station. In fact the digit values stored by the five circuits 103, 104 etc., of the temporary store 106 are transferred to the first row of the main store 108 upon the occurrence, as determined by a gate 114, of a timing signal T'3 when the last stage of the digit counter is in its "1" state provided the vertical counter 102 is registering one of the counts one to ten. At the same time the digit values stored by each row of the main store 108 other than the last row are transferred to the next succeeding row.

A bistable circui t115 which constitutes a row parity counter is also provided. This circuit 115 is set to one of its stable states by a timing signal T'1 when the first stage of the digit counter 101 is in its "1" state and subsequently timing signals T'3 are normally supplied to this store via a gate 116 to cause it to change its state in dependence upon the digit value stored by the second input store 100. When a complete row of digits and the associated row parity digit have been acted on by the row parity counter 115 it should not be in the state previously mentioned. If, however, it is in that state (indicating that there is an error in the received digits) a timing signal T'4 is passed by a gate 116 when the last stage of the digit counter 101 is in its "1" state to switch another bistable circuit 117 which constitutes a row parity error store to a particular state.

There are also five bistable circuits (of which only the circuits 118 and 119 are shown) which provide column parity counters associated one with each of the bistable circuits 103, 104 etc., of the temporary store 106. These column parity counters are all set to a particular state by a timing signal T'2 supplied by a gate 120 when the vertical counter 102 is registering the count one (and thereby supplying a signal to the lead 121) and the first stage of the digit counter 101 is in its "1" state. Timing signals T'3 are supplied to the counter 118, say, by way of a gate 122 to change the state thereof whenever the circuit 103 of the temporary store 106 is storing the digit value "1." It follows therefore that if during normal operation there has been no error in transmission of a group of digits together with their associated column parity digits, each of the column parity counters 118, 119 etc., is switched to the state other than that previously mentioned.

If now the row parity error store 119 indicates that a row parity error has been detected and/or if any one of the column parity counters 118, 119 etc, is in the state to which it was originally set (indicating that a column parity error has been detected) when the vertical counter 102 is registering the count one, a signal is suppled by a gate 123. Such a signal causes a gate 124 to supply a timing signal T'1 to set a first receiver error store 125, which is formed by another bistable circuit, to a particular state when the first stage of the digit counter 101 is in its "1" state.

A second receiver error store 126 which is also formed by a bistable circuit is arranged to be set to a particular state by a timing signal T'2 supplied by a gate 127 when the vertical counter 102 is registering a count of one and the receiver error store 125 is in the said particular state.

When the receiver error stores 125 and 126 have each been set to their particular state a signal is supplied by a gate 128. This signal is passed through a gate 129 and causes the next timing signal T'3 to be passed by a gate 130 to switch a bistable circuit 131 to its off-normal state. When the circuit 131 has been switched in this manner, a signal is supplied to the vertical counter 102 over a lead 132 (which corresponds to the lead 25 of the vertical counter 9) so as to reset that counter. At the same time a signal is supplied over a lead 133 and this signal is sent back to the transmitting station over a low speed channel requesting a repeat of the group of digits in which an error has been detected. This channel may, for example, be a voice frequency telegraphy channel and the manner in which the signal is utilized at the transmitting station to effect the desired repeat will subsequently be described.

The bistable circuit 131 is subsequently reset by the next timing signal T'1.

The disappearance at this time of the signal normally supplied by the receiver error store 125 over the lead 134 temporarily inhibits the supply of timing signals T'4 by the gate 135 to the vertical counter 102 as aforesaid. The error store 125 is however reset by the first timing signal T81 after the vertical counter 102 has been reset so that the vertical count can then proceed.

The receiver error 126 store acts as a memory that an error has been detected at the receiving station after the receiver error store 125 has been reset and is itself reset by the timing signal T'1 that occurs when the last stage of the digit counter is in its "1" state (as determined by a gate 136) and a priming signal as supplied over a lead 137 by the vertical counter 102 when registering a count of ten. (The lead 137 corresponds to the lead 27 of the vertical counter 9).

The receiving station is provided with a tape punch 138 for the purpose of supplying the punched paper tape (not shown) that is a reproduction of the tape supplied to the punched tape reader 33 at the transmitting station. The punch 138 is of the type that upon each operation punches holes in the tape, as appropriate, representing a row of five digits. Five bistable circuits (of which only the two circuits 139 and 140 are shown in the drawings) which form a final store are arranged to be set, by the first timing signal T'3 supplied by a gate 141 when the first stage of the digit counter 101 is in its "1" state and the vertical counter 102 is registering one of the counts one to ten, to store respectively the digit values stored by the appropriate five circuits 107 of the last row of the main store 108. There are also provided five monostable circuits (of which only the circuits 142 and 143 are shown) which are each associated with one of the circuits 139, 140 etc., and a further bistable circuit 144 which acts as a punch control circuit.

The punch control circuit 144 is set to a particular state by each timing signal T'3 supplied by a gate 145 when the first stage of the digit counter 101 is in its "1" state provided the vertical counter 102 is registering a count of one to nine inclusive and the receiver error store 126 is not switched to its "error" state at that time. (For the purpose of detecting this vertical count, the signal on the lead 111 is supplied to one input terminal of the gate 145 and an inverter 146 is arranged to supply the inverse of the signal on the lead 137 to another input terminal.) The monostable circuits 142, 143 etc., associated with the bistable circuits 139, 140 etc., that are storing digit values "1" are switched to their unstable states by a signal supplied by the punch control circuit 144 when (as determined by a gate 147) that circuit is in said particular state and neither of the receiver error stores 125 and 126 is in the state corresponding to an error having been detected. The five monostable circuits 142, 143 etc., are connected to five electromagnets 148, 149 etc., that each control one of the pushing elements (not shown) of the punch 138 so that when these circuits have been switched in accordance with the values of a row of digits, this row is punched out on the tape. The punch control circuit is subsequently reset by the next timing signal T'1. (If the punch 138 is of the type having a continuously rotating part, movement of that part through a predetermined position may cause an electric pulse to be supplied as a further input to the coincidence gate 147 so as to trigger the monostable circuits 142, 143 etc., when the punch is ready to punch out a row of digits. The trailing edge of each such pulse may be utilized to reset the punch control circuit 144 instead of timing signal T'1 as previously described.)

The signal passed by the gate 147 is also used to trigger another monostable circuit 150 which then supplies an operating signal for a short period to the tape feed mechanism 151 of the punch 138. Thus after a punching operation occurrs, the tape is moved on one position.

Turning now to the transmitting station again, the signal transmitted over the low speed channel for a retransmission is fed over a lead 152 and this causes a bistable circuit 153, which is subsequently referred to as the "request retransmit circuit," to be triggered to a particular one of its stable states provided, as determined by a gate 154, another bistable circuit 155, which is subsequently referred to as the "group repeat circuit" is in its normal state. When the request retransmit circuit 153 is triggered in this way, a priming signal is supplied to a bistable circuit 156 which constitutes a first transmitter error store. A concidence gate 157 is arranged to supply a timing signal T2 to the store 156 to switch it when the vertical counter 9 is registering a count of ten and the last stage of the digit counter 6 is in its "1" state. One effect of so switching the transmitter error store 156 is that another bistable circuit 158 is caused to be switched to its off-normal state with the result that a signal is supplied thereby over the lead 25 to reset the vertical counter 9 (to a count of eleven). The circuit 158 is subsequently reset by a timing signal T1.

The second transmitter error store 43 and the group repeat circuit 155 are both switched from their normal states by the next timing signal T3 after the transmitter error store 156 has been switched as aforesaid. The transmitter error store 156 is reset by the first timing signal T4 after the vertical counter 9 has been reset while the request retransmit circuit 153 is reset by a timing signal T1 when the group repeat circuit 155 has been switched from its normal state.

The group repeat circuit 155 is reset to its normal state by the signal supplied by the gate 157, that is to say a timing signal T2 occurring when the vertical counter 9 is registering a count of ten and the last stage of the digit counter 6 is in its "1" state. During the same digit interval a timing signal T3 is supplied by a gate 159 and is utilized to switch yet another bistable circuit 160 from its normal state provided the transmitter error store 43 is then in its off-normal state. A gate 161 is arranged to detect coincidence of the circuit 160 being in its off-normal state and the vertical counter 9 registering a count of ten, this occurring at the end of the next counting cycle of the vertical counter, and the signal supplied thereby is utilized to cause the transmitter error store 43 to be reset.

When the transmitter error store 43 is in the state indicating that an error has been detected at the receiving station, the supply of timing signals T1 to the tape reader control circuit 46 is inhibited so that no digits are then read from the tape. The digits, including parity digits, that are then stored by the main store 40 continue to be shifted from row to row in the manner previously described. Furthermore the store 43 supplies a signal to the gates, such as the gate 162, associated one with each of the bistable circuits 34, 35, 39 etc., of the temporary store 40 so that the digit values stored by the last row of the main store 69 are transferred to the temporary store 40 at each row shift.

It will be appreciated from the above that if an error is detected by the receiving station in the transmission of a first group of digits, a request for retransmission is sent back to the transmitting station while the next group of digits is being signalled. The faulty group is not punched out at the receiving station while the transmitting station is caused to repeat transmission of the digits associated with both groups, this retransmission being preceded by transmission of the "synchronizing" signal. It will also be realized that the transmitting station equipment does not respond to a request for a repeat in respect of the second group if a request has already been received for the first group to be re peated, the second group being repeated automatically. As soon as the two groups have been correctly received at the receiving station the second transmitter error store 43 is reset to its normal state with the result that the tape reader control circuit 46 is no longer inhibited and new digits are read into the temporary store 40 at the transmitting station as previously described.

In describing so far the equipment at the receiving station and the operation thereof, it has been assumed that the equipment is running in synchronism with the equipment at the transmitting station. Clearly this is not necessarily the case and there is circuitry at the receiving station to respond to a "synchronizing" signal transmitted as aforesaid by the transmitting station. In fact a gating arrangement 165 is provided at the receiving station to derive a checking signal when the vertical counter 102 is not registering a count between one and ten inclusive. This gating arrangement 165 is identical to the circuit shown within the broken outline 165' in FIGURE 4 and the signal supplied thereby represents the synchronizing digits and the group count digits. The required group count is effected by a group counter 166 which has the same circuit as that shown within the broken outline 166' in FIGURE 3 and in this case the group counter is responsive to timing signals T'1 supplied by a gate 167. At the commencement of signalling, the group counters at the two stations are initially set to the same count.

The checking signal supplied by the gating arrangement 165 is compared digit by digit by means of gates 168 and 169 with the digit values stored by the input store 100. Any error detected by this comparison causes a signal to be supplied to the gate 129 (which is inhibited by a signal supplied by a gate 170 during the interval associated with the odd/even digit) so that the bistable circuit 131 is triggered and the vertical counter 102 reset as aforesaid.

A further bistable circuit 171 constitutes an odd/even digit store at the receiving station. This store 171 is normally switched by a timing signal T'1 supplied by a gate 172 at the beginning of each group count by the vertical counter 102, a signal being supplied to the gate 172 at this time by an inverter 173 since no signal is then being supplied by a gate 174. The state of the store 171 is compared with that of the input store 100 by means of gates 175 and 176 so that a signal is passed by one of these if the odd/even digit is incorrectly received. Such a signal is passed through a gate 177 and is combined with a timing signal T'3 by a gate 178 so as to trigger a bistable circuit 179 from its normal state, a priming signal being supplied by the gate 170 to the circuit 179 at this time.

Triggering the circuit 179 to its off-normal state causes one of the input signals to the gate 145 to disappear so that the punch control circuit 144 is not then switched as aforesaid to permit operation of the punch 138. The circuit 139 is subsequently reset by a timing signal T'1 when the vertical counter 102 is registering a count of fourteen, a priming signal being supplied for this purpose by the counter 102 over a lead 180.

As previously mentioned the group counter 166 counts signals supplied by the gate 167 and, as determined by a coincidence gate 181, these signals normally occur when the vertical counter 102 is registering a count of one as a result of a signal being supplied by the counter 102 over a lead 182. Other input signals to the gate 182 are supplied by the receiver error store 126 (when in its state corresponding to no error) and by the punch control circuit 144. When an odd/even error has been detected this latter signal disappears so that counting by the group counter 166 stops. Although the group of digits then being received are not punched out (due to the state of the punch control circuit 179), it is necessary for subsequent correct operation of the system for the group counter 166 to be advanced one count before the next group of digits is received. For this purpose there is provided another bistable circuit 183 to which a priming signal is supplied at this time by the circuit 179, this circuit 179 being switched to its off-normal state when the vertical counter 102 is registering a count of fourteen so that a signal is then supplied by the coincidence gate 184. Triggering the circuit 183 in this way causes a signal to be passed by the gates 185 and 186 to the gate 167 with the result that a timing signal T'1 is then supplied to the group counter 166 to advance by one the count thereby. (The circuit 183 is caused to be reset when a signal is supplied thereto by a further bistable circuit 187. The signal on the lead 180 (corresponding to a vertical count of fourteen) is supplied through an inverter 188 to provide the priming signal to one side of the circuit 187 which is switched to a particular state by signals supplied by the gate 167. A coincidence gate 189 followed by an inverter 190 supply a priming signal to the other side of the circuit 187 and switching signals are supplied by a gate 191 so that the circuit 187 normally only remains in said particular state for a short period of time. A signal passed by the gate 167 as a result of circuit 183 having been switched as aforesaid does not cause the circuit 187 to be switched (due to its occurrence during a vertical count of fourteen) so that necessary signal to permit the circuit 183 to be reset is then present.)

Upon a request for a retransmission being made, the group count at the transmitting station is temporarily stopped (by the absence of a signal normally supplied by the transmitter error store 43) and at the receiving station the group count is temporarily stopped (by the absence of a signal normally supplied by the receiver error store 126). At the receiving station the count of the odd/even store 171 is also temporarily halted (by the absence of a signal normally supplied by the receiver error store 126 to the gate 174) while the corresponding store 77 at the transmitting station continues to count.

If now it is assumed that the request for retransmission has resulted from detection of a parity error in a particular group of digits (W say), the request is normally received by the transmitting station during the transmission of the following group (X say). Furthermore, if the odd/even store 77 or 171 at each station is switched to its "odd" state during the original transmission of the group W, the odd/even store 77 will switch to its "even" state during the transmission of the group X while the odd/even store 171 is also switched to its "even" state. (The detected parity error in group W does not cause the receiver error store 125 to be switched to its "error" state until the vertical counter 102 is registering the count of one during transmission of group X, that is to say after the odd/even store 171 has switched.) Thus the odd/even digit that is transmitted just before the retransmission of the group W has the value "0" and this agrees with the state of the odd/even store 171 at the receiving station. The group count digits transmitted similarly agree with the state of the group counter 166 and accordingly the group W is accepted by the receiving station (subject to the parity checks being correct). The system then continues to operate in the normal manner to signal the group X and subsequent groups of digits.

The system is arranged so that a request for retransmission is signalled by the disappearance of a signal that is normally present. This signal may be a voice frequency signal and, if the voice frequency circuit over which the digits are signalled from the transmitting station to the receiving station is a two-way circuit, this signal may be transmitted over the same path as the signal carrying the digits. (The "request retransmission" signal is preferably distinguishable from the other signal by having a different frequency.) In this case a momentary interruption in the said path, for example due to a line break, during the transmission of a required group of digits (D say) is noted by both the transmitting and receiving stations during the transmission of that group. The consequential retransmission of group D is preceded by the next earlier group of digits (C say) that has already been accepted by the receiving station and is not therefore required to be accepted again. In fact the odd/even digit that is transmitted in this case before the retransmission of the group C does not agree with the then state of the odd/even store 171 at the receiving station so that operation of the punch 138 is inhibited during reception of that group. (The group count on the other hand is in agreement so that there is no new request for a retransmission.) The punch 138 is no longer inhibited after receipt of the group C so that the group D and subsequent groups are received and utilized to control the punch in the normal manner.

If, in the circumstances discussed in the last paragraph but one, there is a delay in the receipt by the transmitting station of a request for retransmission, this request may not be received until the next succeeding group of digits (Y say) is being transmitted so that the odd/even stores 77 and 171 will at that time have been switched so that one is "odd" and one is "even." Accordingly, forgetting for the moment the group count check following a request for retransmission, the receiving station would operate in the manner discussed in the last paragraph, to "refuse" the group X but to "accept" the group Y. In other words the groups W and X would be missing in the punched tape produced at the receiving station.

In fact, two groups of digits cannot be missed in the manner just considered since the difference in the group count at the two stations is detected at the receiving station before the group X is received thereby. Accordingly a further request for retransmission is signalled but this condition continues to repeat since once the group count has become out of step it cannot automatically be brought back into step.

When the two group counts disagree in the manner just considered, the vertical counter 102 at the receiving station is reset (to a count of eleven) every time it reaches a count of fourteen. A reset of the counter 102 during a count of fourteen may be utilized to set a further bistable circuit (not shown) which in turn operates a visual indicator. This store is reset when group synchronization is subsequently re-established.

The sequence of events following operation of said visual indicator upon group count disagreement having been detected, depends upon how much tape has been received. If only a small amount of tape has been received it may be scrapped and the transmitting station requested to reset and start the tape from the beginning again. If a large amount of tape has been received, the punched tape is removed from the punch. The transmitting station is requested to reset, pull the tape back two or three feet and start transmitting again. The receiving operator then compares the first few feet of tape with the tape already received, finds the point where the new tape carries on from the old one, and splices the two together. The resultant tape will then be an exact replica of the original tape at the transmitting station.

The group counter 166 at the receiving station may be initially set to a count that is one more than the count to which the group counter 79 at the transmitting station is set. Just prior to the first transmitted group count being received, the group counter 166 at the receiving station is switched to its next count. Thus, even if group synchronization is effected before the first group of required digits is received (that is to say the synchronizing digits are correctly received before this group), neither this group nor the second group are initially accepted by the receiving station (due to the apparent group count error) and a request is sent back to the transmitting station for these groups to be repeated. The group counter 166 is not operated at this time due to the absence of the signal normally supplied to the gate 181 by the punch control circuit 144. Normal counting is not, therefore, resumed until after a group of required digits have been utilized to punch the output tape. The group count digits transmitted before the retransmission of the first two required groups of digits should, therefore, be in agreement with the state at that time of the group counter at the receiving station so that those groups are then accepted by the receiving station and thereafter signalling occurs in the normal manner.

The system described above may be modified for operation in either direction. In this case it s not necessary to duplicate all the equipment since many items may be used in both modes of operation. For example the circulating register for supplying timing signals, the digit counter, the vertical counter and the temporary store may be used in both modes while part of the "transmitting station" main store may be used as the main store required when operation in the receiving mode.

We claim:

1. Equipment for the transmitting station of a data signalling system, said equipment comprising:

(A) a cyclic counter, (B) means to supply to said counter a train of regularly recurring impulses to cause the counter to be triggered to a plurality of different states in turn, (C) a digital data store, (D) means to supply signals carrying digital data to said data store which temporarily stores that data, (E) an output path, (F) means to supply to said output path a digital output signal of said equipment by reading from said store a succession of sub-groups of digits under the control of said counter, (G) each of said states of the counter resulting in one said sub-groups being read out in this manner, (H) repeat means to cause the last mentioned means to re-operate in respect of a group consisting of a plurality of such sub-groups of digits that have already been read out from said store, (I) signal generating means to supply a digital synchronizing signal having a predetermined characteristic pattern of digits, (J) counter modifying means to increase said plurality of cyclic states of said counter by the addition of further states to which the counter is triggered by said impulses, and (K) means to cause the counter modifying means to be operated prior to the operation of said repeat means so as to temporarily to increase the number of cyclic states of the counter and while the counter is in said further states to cause the digital synchronizing signal to be supplied to said output path.

2. Equipment for the transmitting station of a data signalling system, said equipment comprising:

(A) a cyclic counter, (B) means to supply to said counter train of regularly recurring impulses to cause the counter to be triggered to a plurality of different states in turn, (C) a digital data store, (D) means to supply electric signals carrying digital data to said data store which temporarily stores that data, (E) means to derive electric signals representing parity digits in respect to a group of data digits and to supply those signals to said data store which temporarily stores those digits, (F) an output path, (G) means to supply to said output path a digital signal obtained by reading from said store under the control of said counter a succession of sub-groups of digits temporarily stored thereby, (H) each of said states of the counters resulting in one such sub-group being read out and each of said groups of data digits with the associated parity digits being read out in this manner during one complete cycle of operation of the counter, (I) repeat means to cause the last mentioned means to re-operate in respect of one of said groups of digits that has already been read out from said store, (J) signalling generating means to supply a digital synchronizing signal some of the digits of which have a predetermined digital pattern, (K) an input path, (L) retransmission control means responsive to a request retransmission signal received over said input path, (M) counter modifying means operable under the control of said retransmission control means to increase the number of cyclic states of said counter by the addition of further states to which the counter is triggered by said impulses, (N) means operable under the control of said counter to supply said digital synchronizing signal to the output path while said counter is in said further states, and (O) means operable under the control of said retransmission means to cause the repeat means to be operative when the counter is triggered to said plurality of states subsequent to said digital synchronizing signal being supplied to the output path.

3. Equipment according to claim 2 wherein there also are provided a cyclic group counter and means to advance the count registered by said group counter in response to each group of data digits being stored by said store, said signal generating means being responsive to the count registered by said group counter and the synchronizing signal supplied thereby including information in respect of that count.

4. A data signalling system comprising:

(A) a transmitting station, (B) a receiving station, (C) a data signalling path between the two stations, and (D) a request retransmission path between the two stations;

(E) the transmitting station including (I) a first cyclic counter, (II) means to supply to the first counter a train of regularly recurring impulses to cause the counter to be triggered to a plurality of different states in turn, (III) a first digital data store, (IV) means to supply electric signals carrying digital data to the first data store which temporarily stores that data, (V) means to derive electric signals representing parity digits in respect of a group of data digits and to supply those signals to the first data store which temporarily stores those digits, (VI) means to supply to said data signalling path a digital signal obtained by reading from the first store a succession of sub-groups of digits temporarily stored thereby under the control of the first counter, (VII) each of said states of the counters resulting in one such sub-group being read out and each of said groups of data digits with the associated parity digits being read out in this manner during one complete cycle of operation of the counter, (VIII) repeat means to cause the last mentioned means to re-operate in respect of one of said groups of digits that has already been read out from the first store, (IX) signal generating means to supply a digital synchronizing signal some of the digits of which have a predetermined digital pattern, (X) retransmission control means responsive to a request retransmission signal over said request retransmission path, (XI) first counter modifying means operable under the control of said retransmission control means to increase the number of cyclic states of the first counter by the addition of further states to which the counter is triggered by said impulses, (XII) means operable under the control of the first counter to supply said digital synchronizing signal to the data transmission path while the first counter is in said further states, and (XIII) means operable under the control of said retransmission means to cause the repeat means to be operative when the first counter is triggered to said plurality of states subsequent to said digital synchronizing signal being supplied to the data transmission path; and (F) the receiving station including (I) a second cyclic counter, (II) means to supply to the second counter a train of regularly recurring impulses to cause that counter to be triggered to a plurality of different states in turn, (III) a second digital data store, (IV) means to cause successive sub-groups of digits which are received over said data signalling path to be stored at different locations in said second store under the control of said second counter, (V) each of said states of the second counter resulting in one sub-group of digits being so stored, (VI) check means to ascertain by reference to said parity digits whether there is an error in a group of data digits and its associated parity digits as received, (VII) output means normally to respond to the required digital data store by the second store in respect of each group of received digits, (VIII) means to inhibit operation of the output means upon the check means ascertaining that an error has occurred, (IX) means to supply a request retransmission signal to said request retransmission path upon an error being detected by said check means, (X) a second counter modifying means temporarily to increase the number of cyclic states of the second counter by the addition of further states to which the counter is triggered by the impulse supplied thereto upon the check means ascertaining the existence of an error, (XI) means to identify said predetermined pattern of digits in the digits received over the data signalling path while the second counter is in its further states, and (XII) means operable upon failure of the last mentioned means to identify said predetermined pattern to maintain the second counter modifying means operative and to set the second counter to one of said further states thereof so that the second counter continues to be reset in this manner until synchronism between that counter and the received data signal is re-established.

5. A data signalling system according to claim 4 wherein the transmitting station also is provided with a first cyclic group counter and means to advance the count registered by this group counter in response to each group of data digits being stored by the first data store, said signal generating means being responsive to the count registered by the first group counter and the synchronizing signal supplied thereby including information in respect of that count, and wherein the receiving station also is provided with a second cyclic group counter, means to advance the count registered by this second group counter in response to each normal cycle of operation of said second counter, means to compare the information as part of said synchronizing signal in respect of the group count by the first group counter and the state of the second group counter, and means responsive to the last mentioned means to inhibit operation of said output means when the state of the second group counter does not correspond to the signalled information in respect of the group count by the first group counter.

References Cited by the Examiner

UNITED STATES PATENTS

| | | | |
|---|---|---|---|
| 2,978,541 | 4/1961 | Steeneck et al. | 340—146.1 X |
| 3,131,377 | 4/1964 | Grondin | 340—146.1 X |
| 3,223,974 | 12/1965 | Kok et al. | 340—146.1 |
| 3,231,859 | 1/1966 | Oliari | 340—146.1 |
| 3,242,461 | 3/1966 | Silberg et al. | 340—146.1 |

MALCOLM A. MORRISON, *Primary Examiner.*

M. P. ALLEN, K. MILDE, *Assistant Examiners.*